United States Patent
Yamada

(10) Patent No.: US 8,494,769 B2
(45) Date of Patent: Jul. 23, 2013

(54) INFORMATION SYSTEM, TERMINAL DEVICE, AND INFORMATION CENTER DEVICE

(75) Inventor: Ichizou Yamada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 1594 days.

(21) Appl. No.: 11/878,658

(22) Filed: Jul. 26, 2007

(65) Prior Publication Data

US 2008/0051992 A1 Feb. 28, 2008

(30) Foreign Application Priority Data

Aug. 23, 2006 (JP) ................... 2006-226671

(51) Int. Cl.
G01C 21/34 (2006.01)

(52) U.S. Cl.
USPC ........................................ 701/533

(58) Field of Classification Search
USPC ............... 701/209, 24, 119, 400, 408, 423, 701/424, 532, 533; 455/456, 457
See application file for complete search history.

(56) References Cited

U.S. PATENT DOCUMENTS

| 6,330,453 B1 * | 12/2001 | Suzuki et al. ................. 455/457 |
| 6,636,802 B1 * | 10/2003 | Nakano et al. ................. 701/208 |
| 6,970,786 B2 | 11/2005 | Hayama et al. |
| 2004/0172194 A1 * | 9/2004 | Muramatsu et al. .......... 701/209 |
| 2006/0238378 A1 * | 10/2006 | Ohdachi ..................... 340/995.1 |

FOREIGN PATENT DOCUMENTS

| JP | A-2002-340573 | 11/2002 |
| JP | A-2006-064632 | 3/2006 |

* cited by examiner

Primary Examiner — John Q Nguyen
Assistant Examiner — Rodney P King
(74) Attorney, Agent, or Firm — Posz Law Group, PLC

(57) ABSTRACT

An information center device computes a guided route. It selects a newly opened road connecting to the guided route and traces the newly opened road from the connection point to a point at which the newly opened road intersects another road. Then, it determines block maps containing the traced newly opened road as those to be transmitted to the automobile navigation system. Therefore, the automobile navigation system can utilize block maps containing the newly opened road connected to the guided route as well as block maps associated with the guided route. As a result, the user can get information on where the newly opened road leads and connects, and easily deviate from the guided route and select a route going through the newly opened road at his/her own will.

19 Claims, 8 Drawing Sheets

LEVEL 5
LEVEL 4
LEVEL 3
LEVEL 2
LEVEL 1
LEVEL 0

| LEVEL | BLOCK MAP NO. | LATEST GENER. | FROM ONE-GENER. AGO | FROM TWO-GENER. AGO | |
|---|---|---|---|---|---|
| 2 | (240, 8) | 15 | ADDED NODE:XXXXX<br>ADDED NODE:XXXXX<br>ADDED LINK:XXXXX<br>JUNCTION NODE<br>:XXXXX<br>⋮ | ADDED NODE:XXXXX<br>ADDED NODE:XXXXX<br>ADDED LINK:XXXXX<br>JUNCTION NODE<br>:XXXXX<br>⋮ | ⋯ |

⋮

BEFORE

S 404 401 403 G 405

AFTER

S 404 401 411 409 403 G 407 405

BEFORE

AFTER

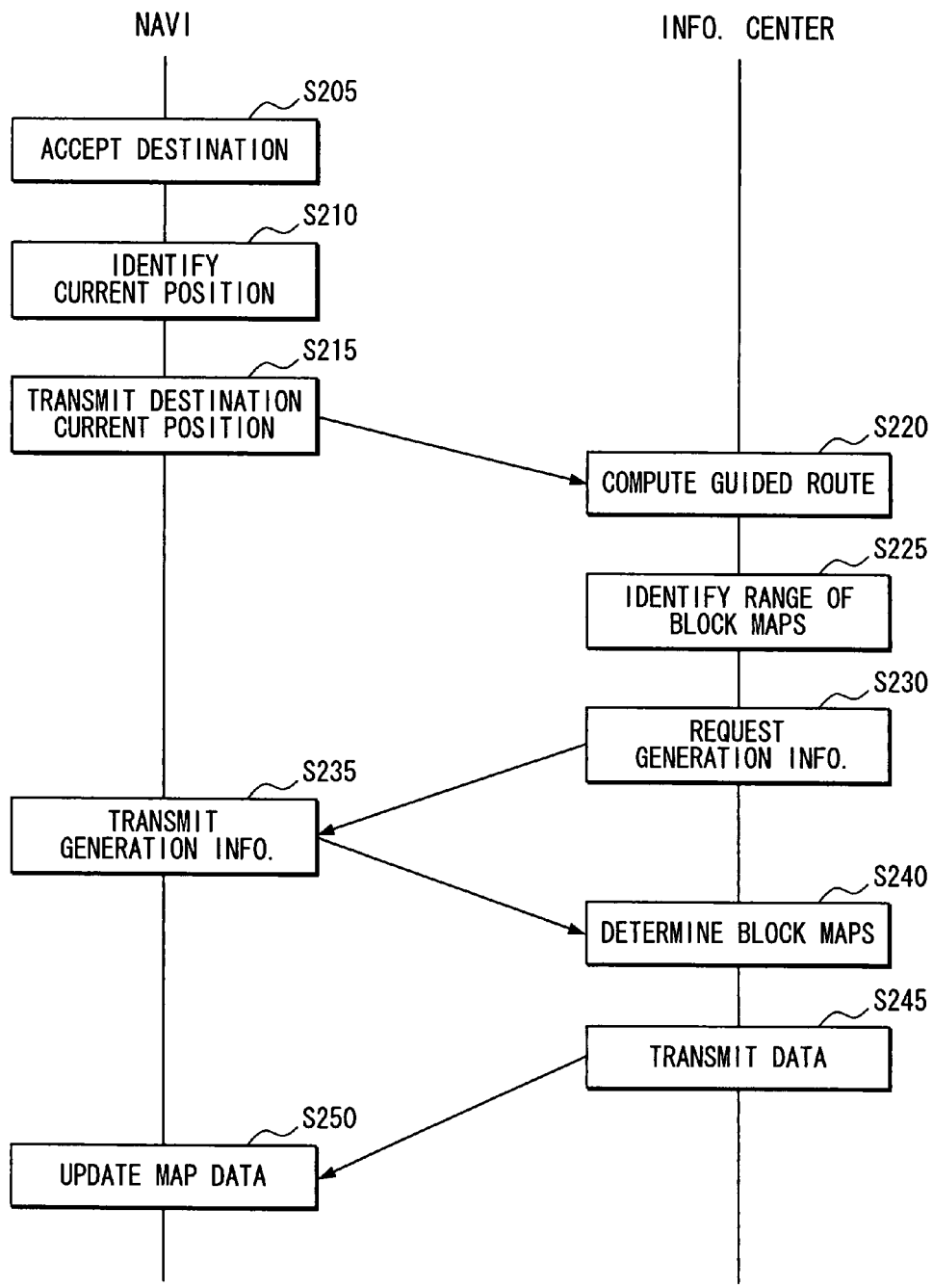

INFORMATION SYSTEM, TERMINAL DEVICE, AND INFORMATION CENTER DEVICE

CROSS REFERENCE TO RELATED APPLICATION

This application is based on and incorporates herein by reference Japanese Patent Application No. 2006-226671 filed on Aug. 23, 2006.

FIELD OF THE INVENTION

The present invention relates to an information system that gives guidance on a route to a specified destination and the like.

BACKGROUND OF THE INVENTION

In recent years, there have been known routing assistance devices that acquire map information from an information center via a communication network and gives route guidance using the acquired map information. With such a routing assistance device, the latest map information in the possession of an information center is always available without changing a map disk such as DVD-ROM when map information is updated.

However, there is limitation on the amount of map information acquirable from an information center at a time because of the limited size of the storage area in a routing assistance device, the limited channel capacity of communication networks, a limited communication time, and the like. To cope with this, the technique described in Patent Document 1 is constructed so as to perform the following operation: when there is an area that contains a route to a destination and is not possessed as map data by a routing assistance device, map data on this area is acquired from an information center. That is, the amount of information acquired from an information center is reduced by acquiring only map information on an area used in route guidance of map information from among multiple divided areas.

Patent Document 1: JP-A-2002-340573

However, the invention disclosed in Patent Document 1 may pose a problem, e.g., when a new road, which is connected with a guided route leading to a destination and which is also able to reach the same destination, is opened to traffic. In fact, all the necessary road map data covering this new road to the destination may not be entirely downloaded from the information center to the routing assistance device. Thus, a user may not learn where the new road connects. As a result, it is difficult for him/her to think of and select an alternative route getting off the current guided route and going through the new road at his/her own will. That is, it is not easy for the user to deviate from the guided route and select the road newly opened to traffic at his/her own will.

It is expected that the storage area of routing assistance devices and the channel capacity of communication networks will be expanded thanks to technological advances. Thus, it will be possible to increase the amount of information acquired from an information center as compared with the present situation.

SUMMARY OF THE INVENTION

The invention has been made with the above problem and situation taken into account, and it is an object of the invention to provide a technology to make it easy to deviate from a guided route and select a newly opened road at a user's own will.

To achieve the above object, according to an example of the invention, an information system is provided as follows. A terminal device and an information center device are included. The terminal device includes a terminal storage unit and a terminal control unit. The terminal storage unit is capable of storing block maps, which are divided on a block-by-block basis, together with their generation information. The terminal control unit transmits information on a departure place, a destination, and the generation information of block maps stored in the terminal storage unit to the information center device. Further, the terminal control unit stores block maps and their generation information transmitted from the information center device, in the terminal storage unit.

The information center device includes a center storage unit and a center control unit. The center storage unit stores block maps divided on a block-by-block basis, their generation information, and information on intergenerational road updating. The center control unit computes a guided route based on information on the departure place and the destination transmitted from the terminal device. It determines whether or not any latest block map not in the possession of the terminal device, of block maps containing the guided route, is present in the center storage unit. This determination is made based on the generation information transmitted from the terminal device and information stored in the center storage unit. When such a block map exists, the center control unit transmits the block map and its generation information to the terminal device, and further determines whether or not any newly opened road connected to the computed guided route is contained in the block map transmitted to the terminal device. This determination is made based on the generation information transmitted from the terminal device and information stored in the center storage unit. When such a newly opened road exists, the center control unit transmits not only the block map containing the guided route but also a block map containing the newly opened road to the terminal device.

When the information system is constructed as mentioned above, the following advantage is brought: not only block maps related to a guided route but also block maps containing a newly opened road connected to the guided route are stored in the terminal storage unit of the terminal device and are available. Therefore, a user can easily get information on where a newly opened road leads and connects, and select a route deviating from a guided route and going through the newly opened road at his/her own will.

Furthermore, a terminal device and an information center device for use in such an information system may be respectively singly configured and brought into the market. Even though a terminal device is singly configured, the above-mentioned effect can be obtained by combining it with a corresponding information center device. Even though an information center device is singly configured, the above-mentioned effect can be obtained by combining it with a corresponding terminal device.

BRIEF DESCRIPTION OF THE DRAWINGS

The above and other objects, features, and advantages of the present invention will become more apparent from the following detailed description made with reference to the accompanying drawings. In the drawings:

FIG. 9 is a diagram illustrating the operation of an information system.

DETAILED DESCRIPTION OF THE PREFERRED EMBODIMENTS

Hereafter, description will be given to embodiments in which the invention is applied with reference to the drawings. The embodiments of the invention are not limited to those described below, and the invention can be embodied in various modes without departing from the technical scope of the invention.

(Description of Configuration)

Figure 1:
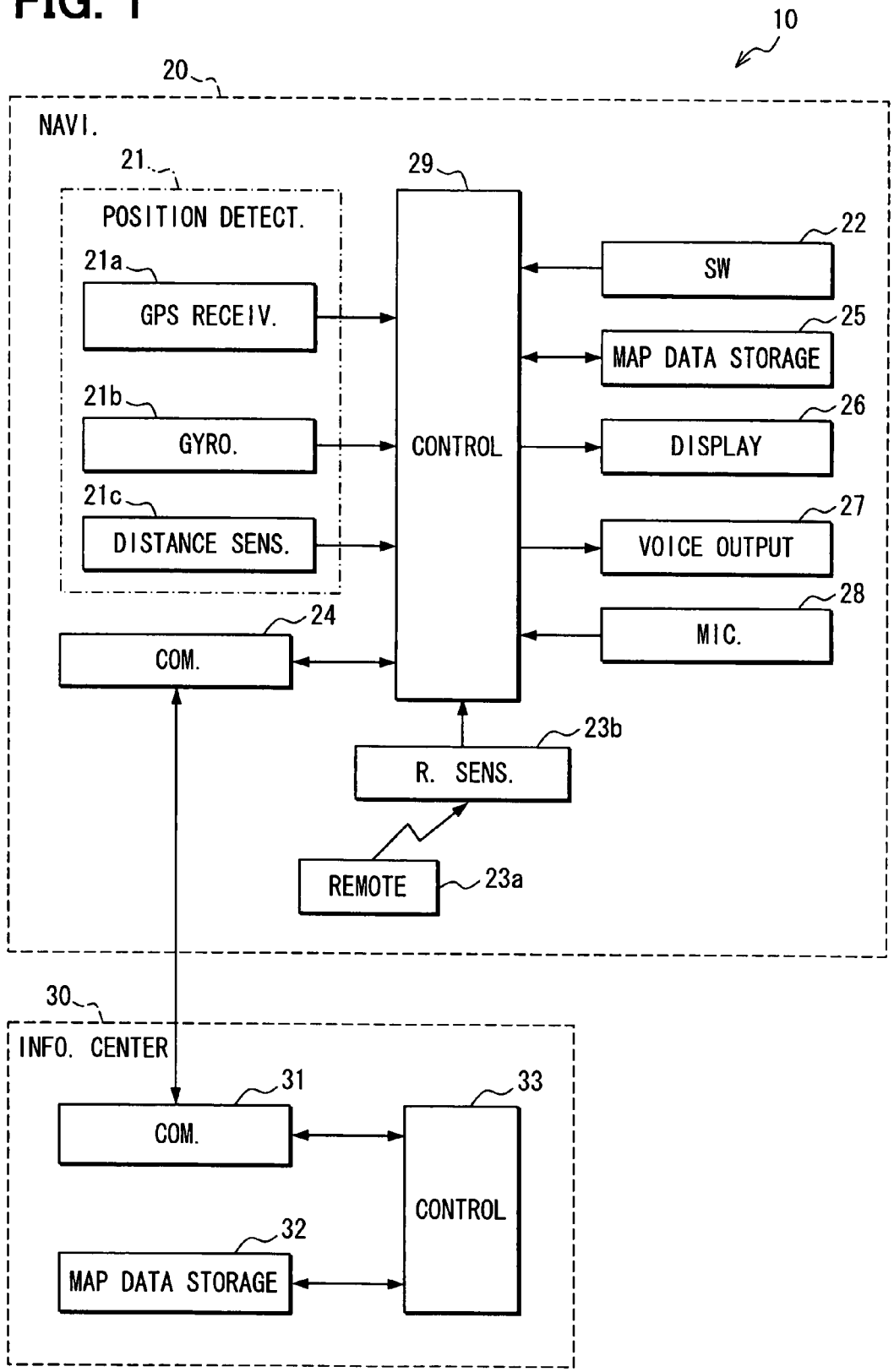
FIG. 1 is a block diagram illustrating the general configuration of an information system in an embodiment.

FIG. 1 is a block diagram illustrating the general configuration of an information system 10 of the embodiment. As illustrated in FIG. 1, the information system 10 includes an automobile navigation system 20 and an information center device 30. In FIG. 1, only one automobile navigation system 20 is depicted; however, multiple automobile navigation systems 20 exist in actuality.

The automobile navigation system 20 is mounted in a vehicle, and includes: a position detector 21 that detects the current position of the vehicle; an operation switch group 22 for inputting various instructions from a user; a remote control terminal (hereafter, referred to as "remote") 23a that is capable of inputting various instructions, just like the operation switch group 22, and is separate from the automobile navigation system 20; a remote sensor 23b that inputs signals from the remote 23a; an external communication unit 24 that is connected to a packet communications network and communicates with the outside; a map data storage unit 25 capable of storing map data, voice data, and the like; a display unit 26 for displaying maps and varied information; a voice output unit 27 for outputting various guiding voices and the like; a microphone 28 that outputs electrical signals based on voice let out by a user; and a control unit 29. The control unit executes varied processing according to inputs from the above-mentioned position detector 21, operation switch group 22, remote sensor 23b, external communication unit 24, map data storage unit 25, and microphone 28. Further, the control unit controls the external communication unit 24, map data storage unit 25, display unit 26, and voice output unit 27.

The position detector 21 includes: a GPS receiver 21a that receives radio waves from artificial satellites for GPS (Global Positioning System) through a GPS antenna, not shown, and outputs the resulting reception signals; a gyro scope 21b that detects the magnitude of rotational motion applied to the vehicle; and a distance sensor 21c that detects a mileage from acceleration in the direction of the length of the vehicle and the like. Based on output signals from these sensors and the like 21a to 21c, the control unit 29 computes the position, azimuth, speed, and the like of the vehicle. There are various methods for determining the current position based on an output signal form the GPS receiver 21a. Either individual positioning method or relative positioning method may be used.

The operation switch group 22 is composed of: a touch panel constructed integrally with the display surface of the display unit 26 and mechanical key switches and the like provided around the display unit 26. The touch panel and the display unit 26 are integrally laminated. There are various types of touch panel, including pressure sensitive type, electromagnetic induction type, capacitance type, and combinations of them, and any type may be used.

The remote 23a is constructed of multiple buttons. It is so configured that when any button is pressed, a signal corresponding to the type of the button reaches the remote sensor 23b by short-range radio communication using infrared rays or the like.

The remote sensor 23b is configured to receive a signal transmitted from the remote 23a and output the received signal to the control unit 29. The external communication unit 24 communicates with the information center device 30 via a packet communications network.

The map data storage unit 25 stores map data (node data, link data, cost data, background data, road data, name data, mark data, intersection data, data about facilities, and the like), together with generation information, on a block-by-block basis. It cannot store map data on the blocks throughout Japan because of its storage capacity, and is so constructed that it can store only data on a predetermined number of blocks.

The display unit 26 is constructed of a liquid crystal display, organic EL display, or the like. The display screen of the display unit 26 can show the following in superposition: a mark indicating the present location identified from the current position of the vehicle detected by the position detector 21 and map data read from the map data storage unit 25; a guided route to a destination; and additional data including names, landmarks, marks for various facilities; and the like. It can also display guidance on facilities and the like.

The microphone 28 is so constructed that, when a user inputs his/her voice (speech), it outputs an electrical signal (aural signal) based on the inputted voice to the control unit 29. The user can operate the automobile navigation system 20 by inputting varied voice to this microphone 28.

The control unit 29 is configured based on a publicly known microcomputer constructed of CPU, ROM, RAM, SRAM, I/O, bus lines connecting these elements, and the like. It carries out varied processing based on programs stored in the ROM and the RAM. For example, it carries out present location displaying processing and route guidance processing. In present location displaying processing, it computes the current position of the vehicle as a set of coordinates and a traveling direction based on various detection signals from the position detector 21. Then, it displays a map of an area in proximity to the current position, read from the map data storage unit 25, and the like on the display unit 26. In route guidance processing, it transmits information on the current position and information on a destination specified by the user to the information center device 30, and provides route guidance based on transmitted route guidance information and map data.

The information center device 30 includes an external communication unit 31 and a control unit 33. The external communication unit 31 communicates with the automobile navigation system 20 via a packet communications network. A map data storage unit 32 stores map data (node data, link data, cost data, background data, road data, name data, mark data, intersection data, data about facilities, and the like) on the blocks throughout Japan on a block-by-block basis. In addition, it also stores information on update of the map data on a block-by-block basis. This update information is stored in a block map update information table described later.

The control unit 33 is configured based on a publicly known microcomputer constructed of CPU, ROM, RAM, SRAM, I/O, bus lines connecting these elements, and the like. It carries out varied processing based on programs stored in the ROM and the RAM. For example, it computes a guided route based on information transmitted from the automobile navigation system 20, and transmits map data required for guidance, together with information on the computed guided route, to the automobile navigation system 20.

(Description of Map Data)

Figures 2, 3:
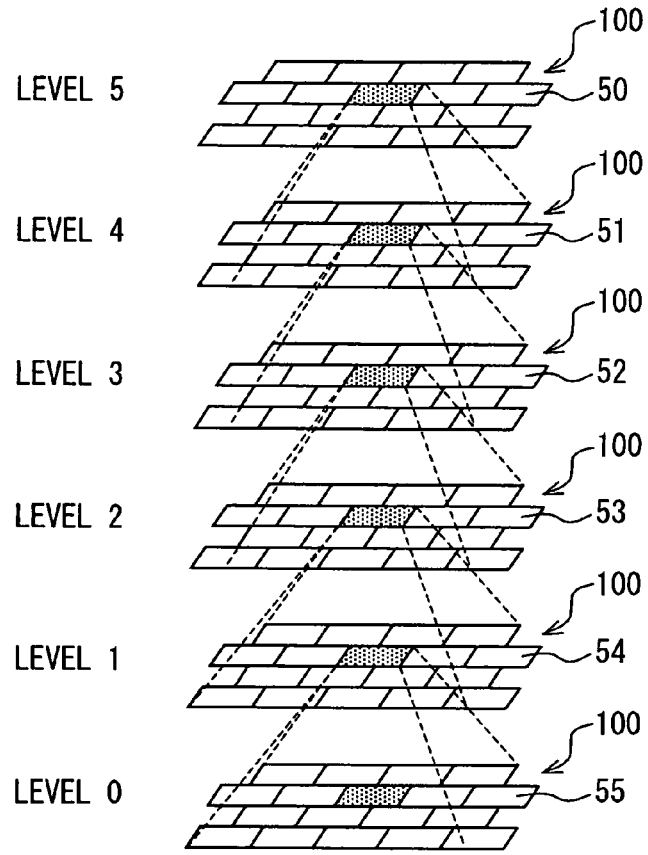
FIG. 2 is an explanatory drawing of the hierarchical structure of map data.
FIG. 3 is a diagram explaining block map update information.

Description will be given to the hierarchical structure of map data. As illustrated in FIG. 2, map data 100 is generated and recorded at each of levels, from level 5 to level 0, according to detailedness. Level 5 is a level at which block maps 50 in the widest range are embraced and only geographical data is recorded. Level 4 is a level at which block maps 51 in a wide range next to level 5 are embraced, and geographical data and road data on expressways are recorded. Level 3 is a level at which block maps 52 in a wide range next to level 4 are embraced, and road data on national highways is recorded in addition to geographical data and road data on expressways. Level 2 is a level at which block maps 53 in a wide range next to level 3 are embraced, and road data on prefectural highways is recorded in addition to geographical data and road data on expressways and national highways. Level 1 is a level at which block maps 54 in a wide range next to level 2 are embraced, and road data on city roads is recorded in addition to geographical data and road data on expressways, national highways, and prefectural highways. Level 0 is a level at which block maps 55 in a wide range next to level 1 are embraced, and road data on narrow streets is recorded in addition to geographical data and road data on expressways, national highways, prefectural highways, and city roads. That is, at level 5, data on the widest areas is recorded, and at level 0, the most detailed data is recorded.

The road data in the map data composes a map by connecting multiple nodes, such as intersections, through links. With respect to each link, the road data includes link information composed of: unique number (link ID) for identifying the link; link length indicating the length of the link; the longitudes and latitudes (x- and y-coordinates) of the start point and the end point of the link; the road width of the link; and data on road classification (road information such as toll road), and road ID for identifying the road. In addition, map data contains place name information, traffic information, facility information, and related coordinates (x- and y-coordinates).

The map data storage unit 32 of the information center device 30 holds such map data on areas throughout Japan, and the map data storage unit 25 of the automobile navigation system 20 holds only part of the map data.

Description will be given to a block map update information table stored in the map data storage unit 32 of the information center device 30 with reference to the table layout chart in FIG. 3.

Each record of the block map update information table is composed of: "level" indicating the level of map data; "block map number" indicating a number for identifying each block map; "latest generation number" indicating the latest generation number of the block map; "information on update from previous generation" indicating an added node, an added link, a junction node, and the like added when a block map of the previous generation was updated; "update information on update from two generations ago" indicating an added node, an added link, a junction node, and the like added when a block map of two generations ago was updated to a block map of the previous generation; "information on update from three generations ago," not shown; "information on update from four generations ago," not shown; and "information on update from five generations ago," not shown. The "information on update from three generations ago" indicates an added node, an added link, a junction node, and the like added when a block map of three generations ago was updated to a block map of two generations ago. The "information on update from four generations ago" indicates an added node, an added link, a junction node, and the like added when a block map of four generations ago was updated to a block map of three generations ago. The "information on update from five generations ago" indicates an added node, an added link, a junction node, and the like added when a block map of five generations ago was updated to a block map of four generations ago.

Therefore, the following can be grasped with respect to a block map at a specific level by referring to the block map update information table: what is the latest generation number; whether or not a node, a link, or the like was added to a block map of a generation past; and what kind of node, link, or the like was added.

(Description of Operation)

Figure 4:
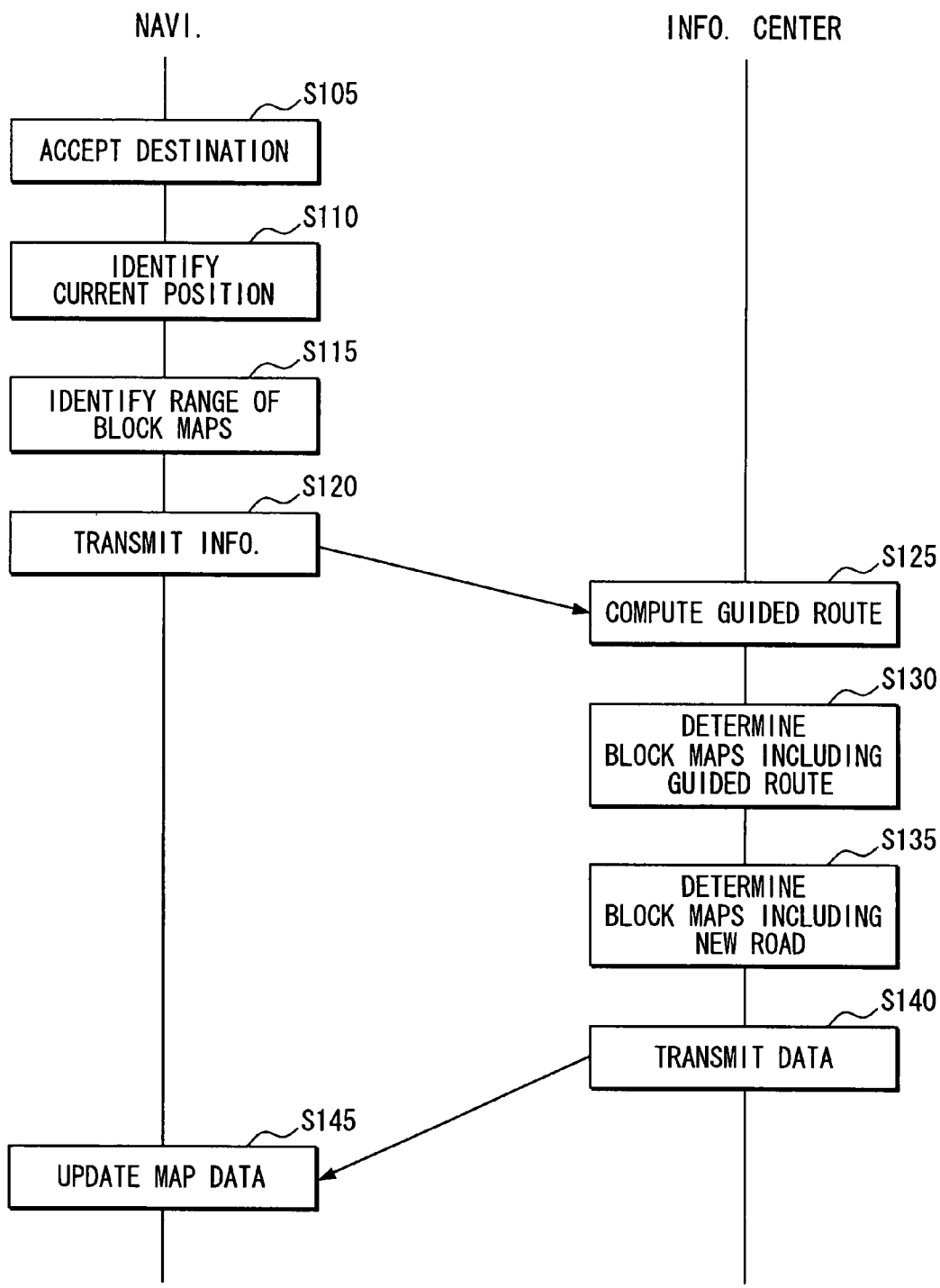
FIG. 4 is a diagram explaining the operation of an information system.

Description will be given to the operation of the information system 10. With respect to the widely known operation of the automobile navigation system 20, description will be omitted. The operation of the automobile navigation system 20 performed before it starts route guidance in response to input of a destination will be described with reference to the ladder diagram in FIG. 4.

First, the automobile navigation system 20 (more specifically, the control unit 29; ditto for the following) accepts input of a destination from the user through the operation switch group 22 (S105). This means that a point specified on a map displayed on the display unit 26 is taken as a destination or a point specified from among registered points is taken as a destination.

Subsequently, the automobile navigation system 20 identifies the current position (S110). This is done based on a signal acquired from the position detector 21. Subsequently, it identifies the range of block maps estimated to be required for route guidance from the destination accepted at Step S105 and the current position identified at Step S110 (S115). Specifically, a rectangular area having a block map containing the destination and a block map containing the departure place as diametrically opposed vertexes is taken as the above-mentioned range.

Subsequently, the automobile navigation system transmits the following to the information center device 30 (S120): information (latitude and longitude) on the destination accepted at Step S105; information (latitude and longitude) on the current position identified at Step S110; and information (block map number and generation number) on block maps in the range identified at Step S115.

Upon receipt of the above-mentioned information, first, the information center device 30 (more specifically, the control unit 33; ditto for the following) computes one optimum guided route from the destination information and the current position information (S125).

Subsequently, the information center device 30 determines a block map to be transmitted to the automobile navigation system 20 from among block maps containing the guided route (S130). Specifically, it identifies the block maps of blocks containing the route computed at Step S125; compares the latest generation number obtained by referring to the block map update information table with the generation number transmitted from the automobile navigation system 20 with respect to each of the identified block maps; and takes block maps whose generation number transmitted from the automobile navigation system 20 is older as block maps to be transmitted. This processing is carried out with respect to all the above-mentioned levels of map data.

The information center device refers to the block map update information table to inspect the following: whether or not a newly opened road added between when a block map was in the state of a generation in the possession of the automobile navigation system 20 and when the block map is in the latest state is present in the block maps determined to be transmitted. It selects a newly opened road connecting to the guided route computed at Step S125 from among these newly opened roads. The information center device traces this newly opened road from the connection point to a point at which it connects to another road. Then, it determines all the block maps containing the traced newly opened road as those to be transmitted (S135). This is done only for levels 2, 3, and 4 of the above-mentioned levels of map data. This means that: only expressways, national highways, and prefectural highways are selected as a newly opened road; and further, only expressways, national highways, and prefectural highways are taken as the above-mentioned road connecting to the newly opened road.

Subsequently, the information center device transmits the following to the automobile navigation system 20 (S140): information on the guided route computed at Step S125; and map data on the block maps determined at Steps S130 and S135 and their generation information.

When the automobile navigation system receives the information on the guided route, the map data on the block maps, and their generation information from the information center device 30, it carries out the following processing: it updates the corresponding map data and generation information stored in the map data storage unit 25 with the received map data and generation information; and further it starts route guidance based on the received information on the guided route (S145).

Effect of Embodiment

Description will be given to the effect of the above-mentioned embodiment.

Figure 5A:
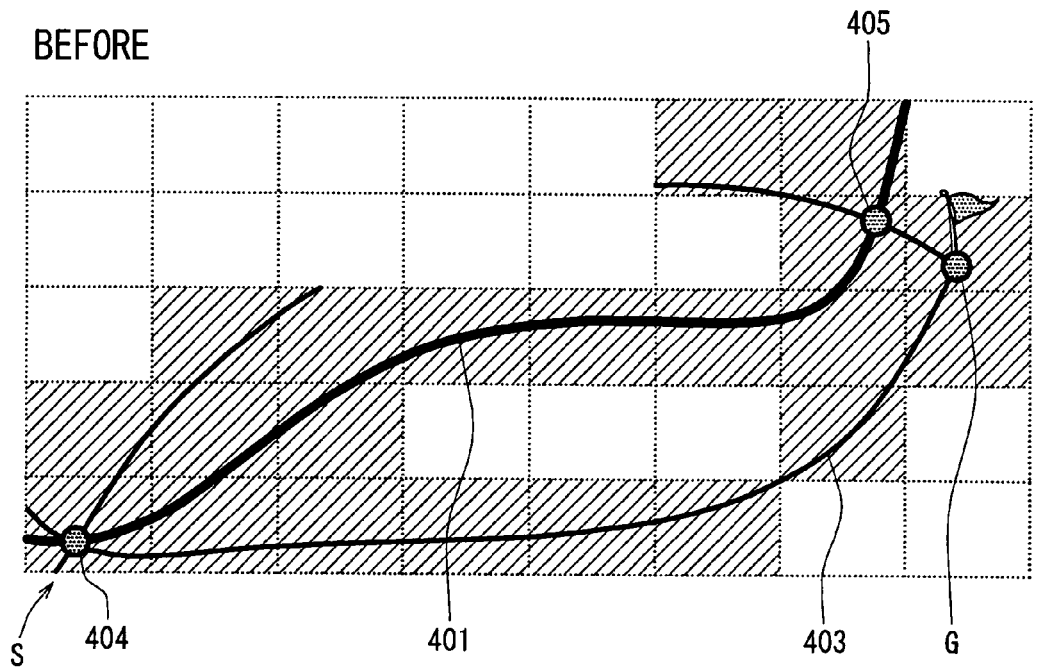
FIGS. 5A and 5B are explanatory drawings illustrating the relation between a newly opened road and block maps in the possession of an automobile navigation system.

(1) Description will be given through comparison with the related art with reference to the explanatory drawings in FIGS. 5A and 5B and FIGS. 6A and 6B. FIG. 5A illustrates the relation between the state of roads before a road is newly opened to traffic and map blocks (hatched portions) in the possession of the automobile navigation system 20 at that time. That is, there are the following routes from a current position S (interchange 404) to a destination point G: a route going through an expressway 401 and getting it off at an interchange 405 and heading down to the destination point G; and a route going through a national highway 403 and heading down to the destination point G. It will be assumed that the automobile navigation system 20 is in possession of block maps containing these routes and roads partly related to these routes. (Refer to the hatched portions.)

Figure 5B:
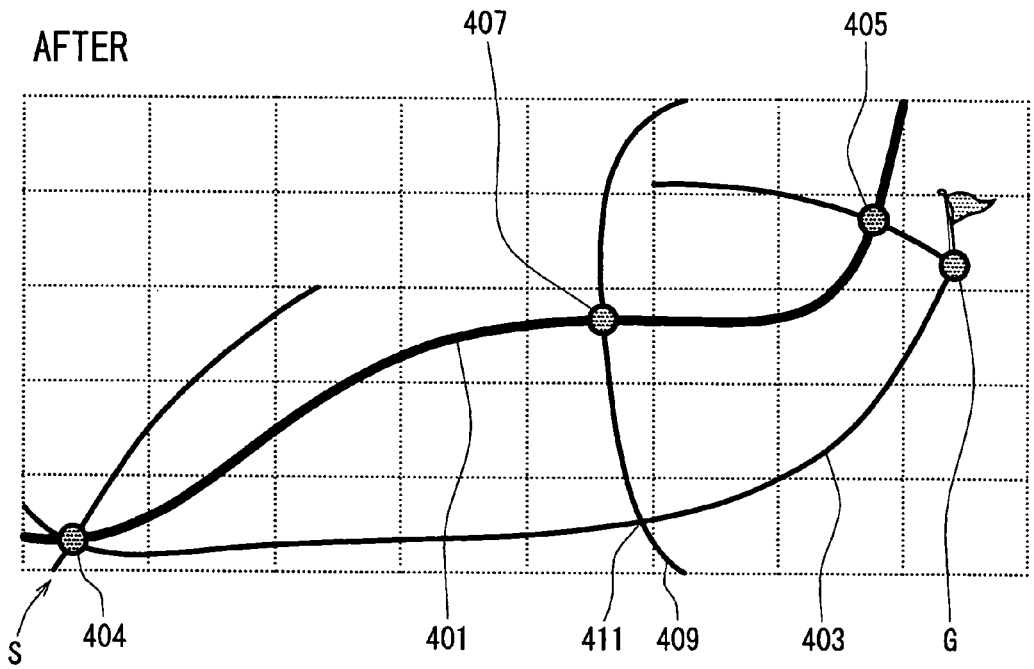
Figure 6A:
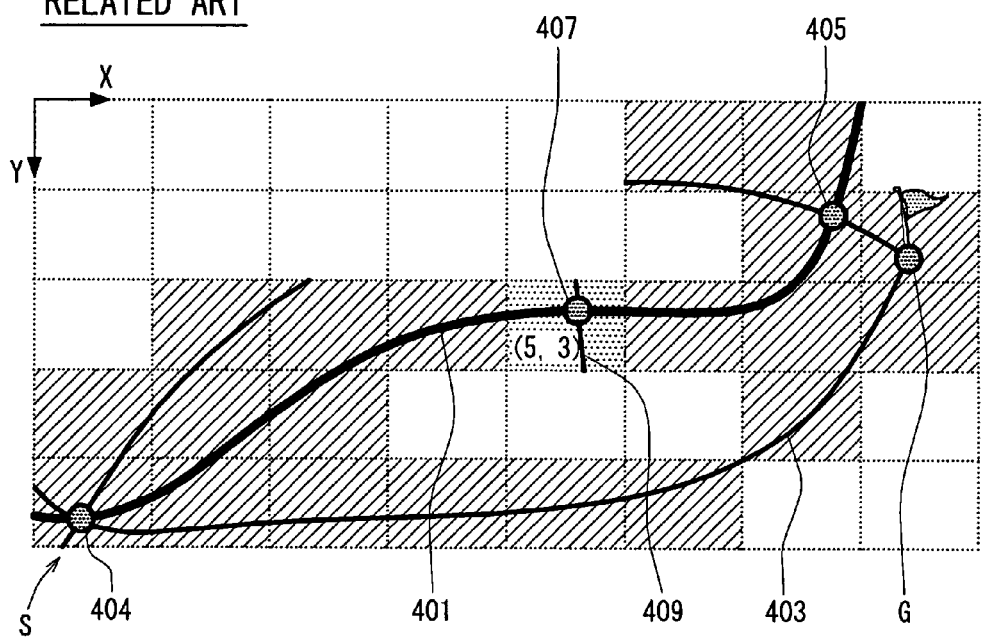
FIGS. 6A and 6B are explanatory drawings comparing with related art with respect to block maps downloaded to an automobile navigation system.

It will be assumed that thereafter, a prefectural highway 409 is opened to traffic and it connects to the expressway 401 at an interchange 407 and connects to the national highway 403 at an intersection 411 as illustrated in FIG. 5B. It will be assumed that the map blocks in the possession of the automobile navigation system 20 remain unupdated. Further, it will be assumed that the information center computes as a guided route a route starting at the current position S (interchange 404), going through the expressway 401 and getting it off at the interchange 405, and heading down to the destination point G. In a conventional automobile navigation system in this case, only the block map (5, 3) indicated as a shaded portion in FIG. 6A is downloaded from the information center. To explain the position of a block map, the following measure will be taken: the position is represented by (X, Y); the block positioned at the uppermost and leftmost of the drawing is taken as reference block (1, 1); the direction toward the right of the drawing is taken as X direction; the direction toward the bottom of the drawing is taken as Y direction; and X and Y are respectively increased on a block-by-block basis. (Ditto for the following)

Therefore, a user of the conventional automobile navigation system cannot learn where the prefectural highway 409 connects. As a result, it is difficult for him/her to think of and select an alternative route getting off the expressway at the interchange 407 and going through the prefectural highway 409 at his/her own will. That is, it is not easy for the user to deviate from the guided route and select a road newly opened to traffic at his/her own will.

Figure 6B:
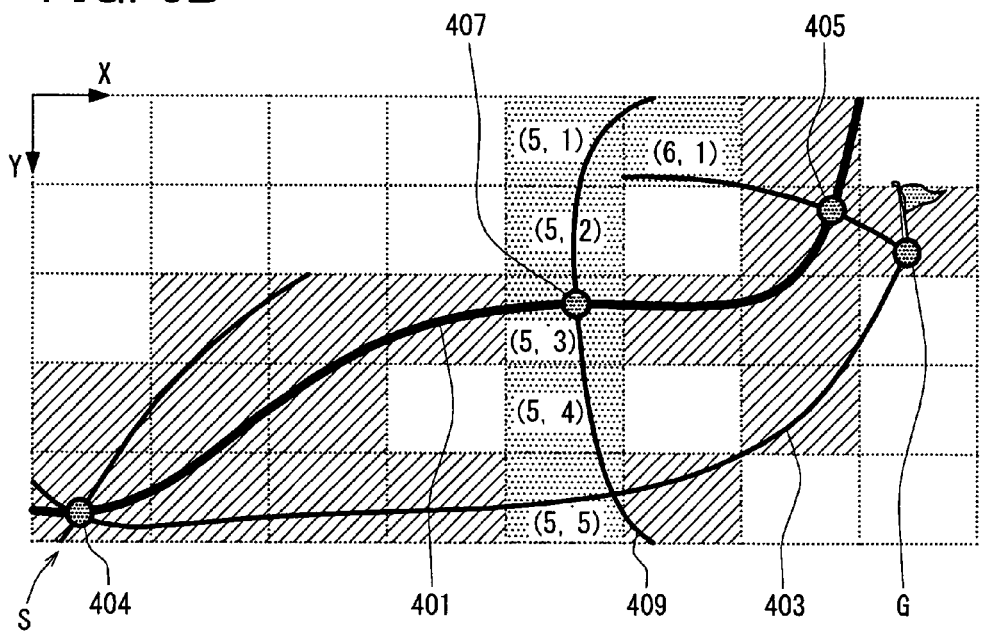

In the automobile navigation system 20 in this embodiment, meanwhile, the block maps (5, 1), (5, 2), (5, 3), (5, 4), (5, 5), and (6, 1) indicated as shaded portions in FIG. 6B are downloaded from the information center device 30.

In this embodiment, therefore, the user can learn how the prefectural highway 409 is extended, where it connects, and the like. For example, the user can easily think of and select the following route as an alternative route at his/her own will: a route getting off the expressway at the interchange 407, going through the prefectural highway 409 and the national highway 403, and leading to the destination point G.

(2) The automobile navigation system 20 in this embodiment is configured to carry out the processing of Step S135 only for level 2, 3, and 4 of all the levels of map data. Therefore, even though a narrow street or a city road connecting to a guided route is newly opened to traffic, that does not have influence on the determination of block maps to be transmitted. That is, a block map that will probably not be used can be prevented from being transmitted, and as a result, the amount of information transmitted to the automobile navigation system 20 is optimized.

Other Embodiment (1) The above embodiment is so constructed that the following processing is carried out at Step S135: a newly opened road connecting to the guided route computed at Step S125 is selected; the newly opened road is traced from the connection point to a point at which it intersects another road (expressway, national highway, or prefectural highway); and all the block maps containing the traced newly opened road are determined as those to be transmitted. Instead, the embodiment may be so constructed that the following is implemented:

At Step S125, guided routes in the second and following places (e.g., five or so) are computed as candidate guided routes in addition to the optimum guided route. At Step S135, the newly opened road is traced until it intersects a candidate guided route.

The reason for this is as follows: when a user deviates from a guided route, in general, he/she will probably use a different candidate guided route expected at the time of departure. Therefore, a newly opened road may only have to be presented to the user at least until it connects to a candidate guided route. Also, with this construction, consequently, the amount of information transmitted to the automobile navigation system 20 can be optimized.

Figure 7A:
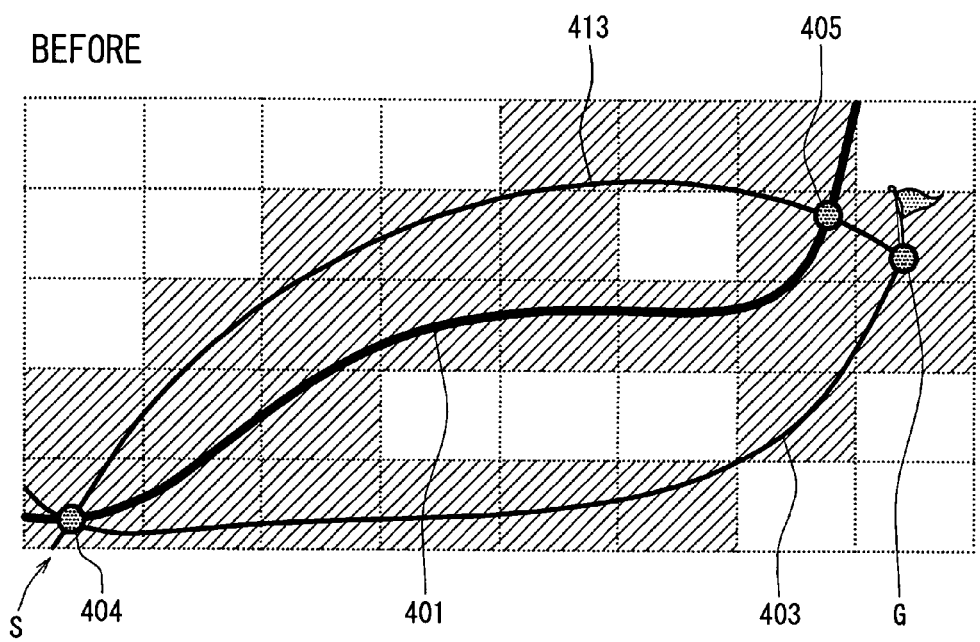
FIGS. 7A and 7B are explanatory drawings illustrating the relation between a newly opened road and block maps in the possession of an automobile navigation system.

Description will be given to an example of this through comparison with the related art with reference to the explanatory drawings in FIGS. 7A and 7B and FIGS. 8A and 8B. FIG. 7A illustrates the relation between the state of roads before a road is newly opened to traffic and map blocks (hatched portions) in the possession of the automobile navigation system 20 at that time. That is, there are the following routes from a current position S (interchange 404) to a destination point G: a route going through an expressway 401 and getting it off at an interchange 405 and heading down to the destination point G; a route going through a national highway 403 and heading down to the destination point G; and a route going through a prefectural highway 413 and heading down to the destination point G. It will be assumed that the automobile navigation system 20 is in possession of block maps containing roads related to these routes. (Refer to the hatched portions.)

Figure 7B:
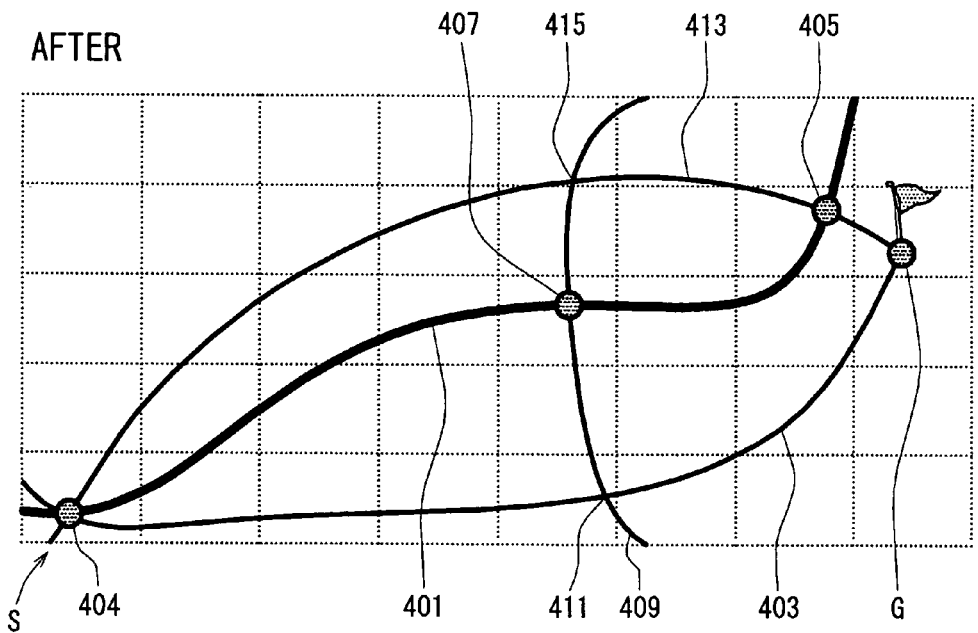
Figure 8A:
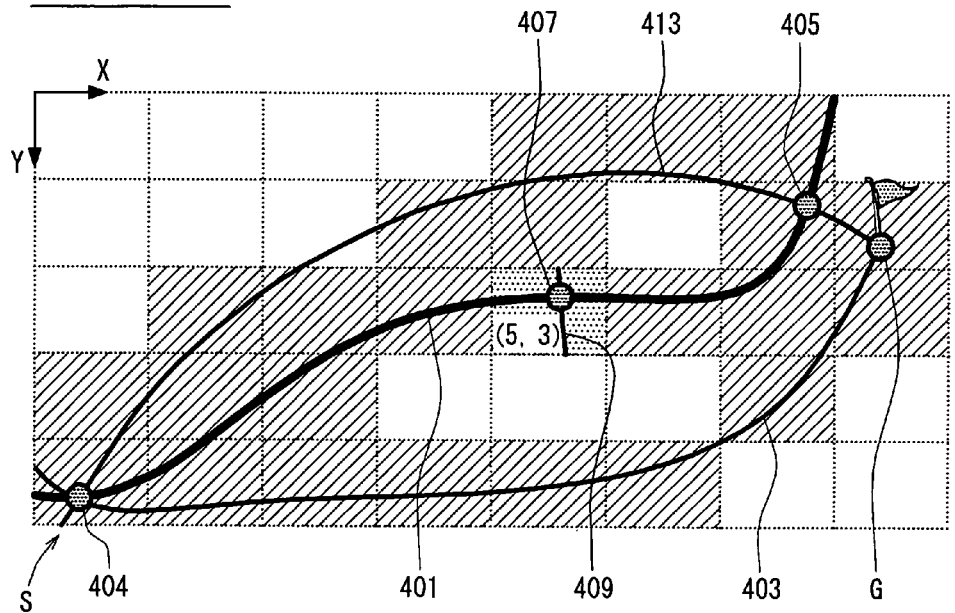
FIGS. 8A and 8B are explanatory drawings comparing with related art with respect to block maps downloaded to an automobile navigation system.
Figure 8B:
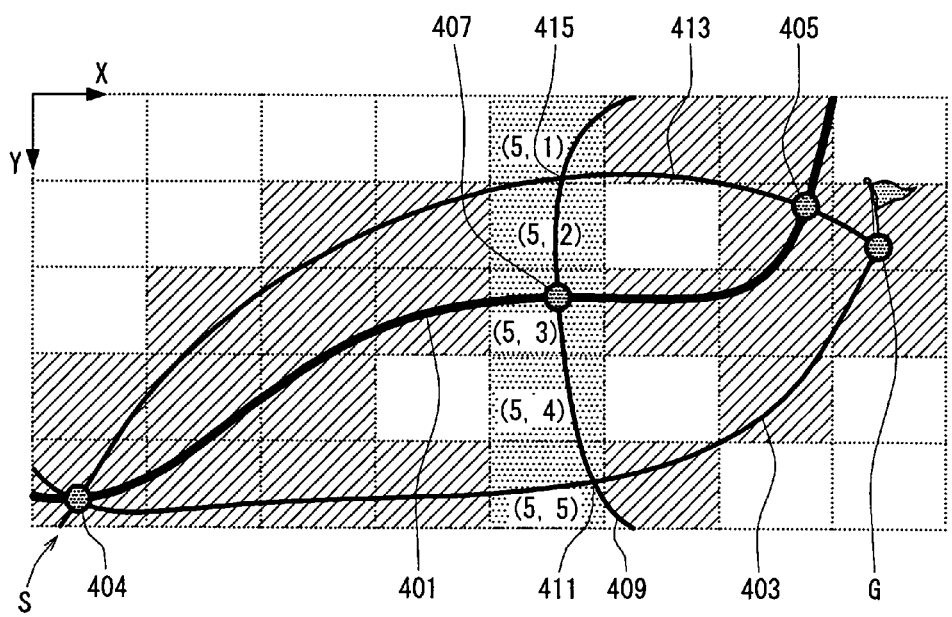

It will be assumed that thereafter, a prefectural highway 409 is opened to traffic and it connects to the expressway 401 at an interchange 407, connects to the national highway 403 at an intersection 411, and connects to the prefectural highway 413 at an intersection 415 as illustrated in FIG. 7B. It will be assumed that the map blocks in the possession of the automobile navigation system 20 remain unupdated. Further, it will be assumed that the information center computes as a guided route a route starting at the current position S (interchange 404), going through the expressway 401 and getting it off at the interchange 405, and heading down to the destination point G. In a conventional automobile navigation system in this case, only the block map (5, 3) indicated as a shaded portion in FIG. 8A is downloaded from the information center.

Therefore, a user of the conventional automobile navigation system cannot learn where the prefectural highway 409 connects. As a result, it is difficult for him/her to think of and select an alternative route getting off the expressway at the interchange 407 and going through the prefectural highway 409 at his/her own will. That is, it is not easy for the user to deviate from the guided route and select a road newly opened to traffic at his/her own will.

In the information center device 30 in the other embodiment mentioned above, meanwhile, the following takes place. As an example, it will be assumed that a route going through the expressway 401 and getting it off at the interchange 405 and heading down to the destination point G is computed as a guided route; and a route going through the prefectural highway 413 and heading down to the destination point G and a route going through the national highway 403 and heading down to the destination point G are computed as candidate guided routes. In this case, in the method of tracing the prefectural highway 409 as a newly opened road from the interchange 407 to the intersection 411, the block maps (5, 3), (5, 4), and (5, 5) are to be transmitted to the automobile navigation system 20. In the method of tracing the prefectural highway 409 as a newly opened road from the interchange 407 to the intersection 415, the block maps (5, 3), (5, 2), and (5, 1) are to be transmitted to the automobile navigation system 20.

Also, in the other embodiment mentioned above, therefore, the user can learn how the prefectural highway 409 is extended, where it connects, and the like. For example, the user can easily think of and select the following route as an alternative route at his/her own will: a route getting off the expressway at the interchange 407, going through the prefectural highway 409 and the national highway 403, and leading to the destination point G.

(2) As another example of the operation before the automobile navigation system 20 starts route guidance, the operation illustrated in the ladder diagram in FIG. 9 is possible. Hereafter, description will be given to this operation with reference to FIG. 9.

First, the automobile navigation system 20 (more specifically, the control unit 29; ditto for the following) accepts input of a destination from the user through the operation switch group 22 (S205). This means that a point specified on a map displayed on the display unit 26 is taken as a destination or a point specified from among registered points is taken as a destination.

Subsequently, the automobile navigation system 20 identifies the current position (S210). This is done based on a signal acquired from the position detector 21.

Subsequently, it transmits information (latitude and longitude) on the destination accepted at Step S205 and information (latitude and longitude) on the current position identified at Step S210 to the information center device 30 (S215).

Upon receipt of the above-mentioned information, first, the information center device 30 (more specifically, the control unit 33; ditto for the following) computes one optimum guided route from the destination information and the current position information (S220).

Subsequently, the information center device 30 identifies the range of block maps estimated to be required for route guidance (S225). Specifically, it identifies block maps containing the guided route computed at Step S220.

Subsequently, the information center device requests generation information from the automobile navigation system 20 with respect to the block maps identified at Step S225 (S230).

Upon receipt of the request for generation information, the automobile navigation system 20 transmits the requested generation information on the block maps (S235).

Upon receipt of the generation information, the information center device 30 determines block maps to be transmitted to the automobile navigation system 20 (S240). Specifically, it compares the generation number transmitted from the automobile navigation system 20 with the latest generation number obtained by referring to the block map update information table; and takes block maps whose generation number transmitted from the automobile navigation system 20 is older as block maps to be transmitted. This processing is carried out with respect to all the above-mentioned levels of map data.

The information center device 30 refers to the block map update information table to inspect the following: whether or not a newly opened road added between when a block map was in the state of a generation in the possession of the automobile navigation system 20 and when the block map is in the latest state is present in the block maps determined to be transmitted. It selects a newly opened road connecting to the guided route computed at Step S220 from among these newly opened roads. The information center device traces this newly opened road from the connection point to a point at which it connects to another road. Then, it determines all the block maps containing the traced newly opened road as those to be transmitted. This is done only for levels 2, 3, and 4 of the above-mentioned levels of map data. This means that: only expressways, national highways, and prefectural highways are selected as a newly opened road; and further, only expressways, national highways, and prefectural highways are taken as the above-mentioned road connecting to the newly opened road.

Subsequently, the information center device 30 transmits the following to the automobile navigation system 20 (S245): information on the guided route computed at Step S220; and map data on the block maps determined at Step S240 and their generation information.

When the automobile navigation system 20 receives the information on the guided route, the map data on the block maps, and their generation information from the information center device 30, it carries out the following processing: it updates the corresponding map data and generation information stored in the map data storage unit 25 with the received map data and generation information; and further it starts route guidance based on the received information on the guided route (S250).

Even the information system 10 that operates as mentioned above brings about the same effect as the effect described under "Effect of Embodiment." In addition, it is possible to reduce the amount of generation information transmitted from the automobile navigation system 20 to the information center device 30.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Thus, the map data storage unit 25 may function as a terminal storage means or unit; the control unit 29 may function as a terminal control means or unit; the map data storage unit 32 may function as a center storage means or unit; and the control unit 33 may function as a center control means or unit.

Furthermore, the software unit or any combinations of multiple software units can be included in a software program, which can be contained in a computer-readable storage media or can be downloaded and installed in a computer via a communications network.

(Aspects)

Aspects of the subject matter described herein are set out in the following clauses.

As a first aspect, an information system includes a terminal device and an information center device. The terminal device includes a terminal storage unit and a terminal control unit. The terminal storage unit is capable of storing block maps divided on a block-by-block basis together with their generation information. The terminal control unit transmits information on departure places and destinations and the generation information of block maps stored in the terminal storage unit to the information center device. Further, the terminal control unit stores block maps and their generation information transmitted from the information center device in the terminal storage unit.

The information center device includes a center storage unit and a center control unit. The center storage unit stores block maps divided on a block-by-block basis, their generation information, and information on intergenerational road updating. The center control unit computes a guided route based on information on a departure place and a destination transmitted from the terminal device. It determines whether or not any latest block map not in the possession of the terminal device, of block maps containing the guided route, is present in the center storage unit. This determination is made based on the generation information transmitted from the terminal device and information stored in the center storage unit. When such a block map exists, the center control unit transmits the block map and its generation information to the terminal device, and further determines whether or not any newly opened road connected to the computed guided route is contained in the block map transmitted to the terminal device. This determination is made based on the generation information transmitted from the terminal device and information stored in the center storage unit. When such a newly opened road exists, the center control unit transmits not only the block map containing the guided route but also a block map containing the newly opened road to the terminal device.

When the information system is constructed as mentioned above, the following advantage is brought: not only block maps related to a guided route but also block maps containing a newly opened road connected to the guided route are stored in the terminal storage unit of the terminal device and are available. Therefore, a user can easily get information on where a newly opened road leads and connects, and select a route deviating from a guided route and going through the newly opened road at his/her own will.

All the block maps containing a newly opened road connected to a guided route may be transmitted to a terminal device. When the newly opened road is long, however, the number of block maps containing it is increased and there is the possibility that the amount of information transmitted to a terminal device becomes too large. To cope with this, as a second aspect, it is advisable to take such a measure as in the information system with respect to block maps containing a newly opened road transmitted to a terminal device. The center control unit transmits to a terminal device a block map containing a road running from a point of junction between a newly opened road and a guided route to a point at which the newly opened road connects to another road at a predetermined level. The "road at a predetermined level" cited here refers to one of roads that will be highly probably used when a route is changed among roads classified by road width, number of driving lanes, road administrator, regulatory running speed, and the like. For example, the following can be taken as "roads at a predetermined level or higher": roads with a road width of 5 m or above; roads of two or more lanes each way; expressways, national highways, and prefectural highways; and roads with a regulatory running speed of 50 km/h or higher.

With this construction, the following advantage is brought: even when a user deviates from a guided route and selects a newly opened road, he/she can learn that he/she can make it to any of roads at a predetermined level, and at the same time, the amount of information transmitted to a terminal device is optimized.

Also, as a third aspect, the amount of information transmitted to a terminal device can be optimized. More specific description will be given. The center control unit computes a guided route together with one or more candidate guided routes. With respect to a block map containing a newly opened road transmitted to a terminal device, the center control unit transmits the following block map to the terminal device: a block map containing a road running from a point of junction between the newly opened road and the guided route to a point at which the newly opened road connects to a candidate guided route. The "candidate guided route" cited here refers to one of conceptual routes but a guided route for which guidance is actually provided.

When a user deviates from a guided route, in general, there is the high possibility that he/she will use a different candidate guided route expected at the time of departure. Therefore, a newly opened road may only have to be presented to the user at least until it connects to a candidate guided route. Also, with this construction, consequently, the amount of information transmitted to a terminal device can be optimized.

All the roads newly opened to traffic can be handled as the above-mentioned newly opened road. However, if those with a narrow road width, such as narrow streets, are handled as the above-mentioned newly opened roads, there is the possibility that the number of block maps to be transmitted is increased. Further, the possibility that a route is changed to such a narrow street is probably low. Therefore, as a fourth aspect, it is advisable to construct the center control unit so as to handle only roads at a predetermined level or higher as newly opened roads. The "road at a predetermined level" cited here is the same as the foregoing.

With this construction, the following advantages are brought: a block map that will probably not be used can be prevented from being transmitted from an information center device to a terminal device; and the amount of information transmitted to a terminal device can be optimized.

The center control unit may be configured to compute only one guided route. Or, as a fifth aspect, it may be configured to compute multiple candidate guided routes in addition to a guided route. In this case, it is advisable to construct the center control unit so that the following is implemented: it determines the latest block map not in the possession of a terminal device among block maps containing a candidate guided route, and transmits it to the terminal device. This determination is made based on the generation information transmitted from the terminal device and information stored in the center storage unit.

As mentioned above, when a user deviates from a guided route, in general, he/she will probably enter one of candidate guided routes initially computed and use it. Therefore, it is advisable to also transmit a block map required to guide the user through such a candidate guided route to the terminal device. Thus, after the user deviates from the guided route, he/she can keep on smoothly driving.

A terminal device and an information center device for use in such an information system may be respectively singly configured and brought into the market (as sixth and seventh aspects). Even though a terminal device is singly configured, the above-mentioned effect can be obtained by combining it with a corresponding information center device. Even though an information center device is singly configured, the above-mentioned effect can be obtained by combining it with a corresponding terminal device.

It will be obvious to those skilled in the art that various changes may be made in the above-described embodiments of the present invention. However, the scope of the present invention should be determined by the following claims.

What is claimed is:

1. An information system including a terminal device and an information center device,
   the terminal device provided in an inside of a vehicle and comprising:
      a terminal control unit for transmitting information on a departure place, a destination, and generation information of block maps stored in the terminal storage unit to the information center device and for storing block maps and generation information transmitted from the information center device in the terminal storage unit; and
      a terminal storage unit capable of storing the block maps, which are divided on a block-by-block basis, together with their generation information,
   the information center device provided outside of the vehicle at a location remote from the vehicle and comprising:
      a center storage unit for storing block maps divided on a block-by-block basis, their generation information, and information on intergenerational road updating; and
      a center control unit for computing a guided route based on the departure place and the destination transmitted from the terminal device,
   the center control unit for determining whether or not a latest block map not in the terminal device, of block maps containing the guided route, is present in the center storage unit, based on the generation information transmitted from the terminal device and information stored in the center storage unit, wherein
   when the latest block map is determined to be present, the center control unit transmits the latest block map and its generation information to the terminal device and further determines whether or not a newly opened road connected to the computed guided route is contained in the latest block map, based on the generation information transmitted from the terminal device, including the information on intergenerational road updating, and information stored in the center storage unit,
   when the newly opened road is determined to be present, the center control unit transmits not only the latest block map containing the guided route but also a block map containing the newly opened road to the terminal device,
   the information on intergenerational road updating including information on updates of a respective block map from one or more previous generations,
   the generation information indicating a latest generation numbers of respective block maps.

2. The information system of claim 1, wherein
with respect to a block map containing the newly opened road transmitted to the terminal device, the center control unit transmits to the terminal device a block map containing a road running from a point of junction between the newly opened road and the guided route to a point at which the newly opened road connects to another road at a predetermined level.

3. The information system of claim 1, wherein
the center control unit computes a guided route together with a candidate guided route,
with respect to a block map containing the newly opened road transmitted to the terminal device, the center control unit transmits, to the terminal device, a block map containing a road running from a point of junction between the newly opened road and the guided route to a point at which the newly opened road connects to the candidate guided route.

4. The information system of claim 1, wherein
the center control unit handles a road at a predetermined level or higher as the newly opened road.

5. The information system of claim 1, wherein
the center control unit computes a candidate guided route along with the guided route, and
the center control unit further determines a latest block map not stored in the terminal device from among block maps containing the candidate guided route based on the generation information transmitted from the terminal device and information stored in the center storage unit, and further transmits the determined latest block map to the terminal device.

6. The information system of claim 1, wherein:
the terminal device further comprises an external communication unit that is connected to a packet communications network;
the information center device further comprises an external communication unit that is connected to the packet communications network; and
the information reciprocally transmitted between the terminal device and the information center device are exchanged by both the external communication unit of the terminal device and the external communication unit of the information center device via the packet communications network.

7. The information system of claim 1, wherein:
the center storage unit stores a whole of map data with respect to a predetermined area; and
the terminal storage unit stores a part of the whole of map data with respect to the predetermined area.

8. The information system of claim 1, wherein:
the information on inter generational road updating includes a latest generation number and information on updates from a multiple previous generations.

9. The information system of claim 1, wherein:
when the newly opened road is determined to be present, the center control unit transmits only the latest block map containing the guided route and the block map containing the newly opened road to the terminal device.

10. The information system of claim 1, wherein:
the generation information comprises a generation number indicating an update generation of an associated one of the block maps.

11. A terminal device comprising a terminal storage unit and a terminal control unit comprised by a terminal device included in an information system including the terminal device and an information center device,
the terminal device provided in an inside of a vehicle and comprising:
the terminal control unit for transmitting information on a departure place, a destination, and generation information of block maps stored in the terminal storage unit to the information center device and for storing block maps and generation information transmitted from the information center device in the terminal storage unit; and
the terminal storage unit capable of storing the block maps, which are divided on a block-by-block basis, together with their generation information,
the information center device provided outside of the vehicle at a location remote from the vehicle and comprising:
a center storage unit for storing block maps divided on a block-by-block basis, their generation information, and information on intergenerational road updating; and
a center control unit for computing a guided route based on the departure place and the destination transmitted from the terminal device,
the center control unit for determining whether or not a latest block map not in the terminal device, of block maps containing the guided route, is present in the center storage unit, based on the generation information transmitted from the terminal device and information stored in the center storage unit, wherein
when the latest block map is determined to be present, the center control unit transmits the latest block map and its generation information to the terminal device and further determines whether or not a newly opened road connected to the computed guided route is contained in the latest block map, based on the generation information transmitted from the terminal device, including the information on intergenerational road updating, and information stored in the center storage unit,
when the newly opened road is determined to be present, the center control unit transmits not only the latest block map containing the guided route but also a block map containing the newly opened road to the terminal device,
the information on intergenerational road updating including information on updates of a respective block map from one or more previous generations,
the generation information indicating a latest generation numbers of respective block maps.

12. An information center device comprising a center storage unit and a center control unit comprised by an information center device included in an information system including a terminal device and the information center device,
the terminal device provided in an inside of a vehicle and comprising:
a terminal control unit for transmitting information on a departure place, a destination, and generation information of block maps stored in the terminal storage unit to the information center device and for storing block maps and generation information transmitted from the information center device in the terminal storage unit; and
a terminal storage unit capable of storing the block maps, which are divided on a block-by-block basis, together with their generation information,
the information center device provided outside of the vehicle at a location remote from the vehicle and comprising:
the center storage unit for storing block maps divided on a block-by-block basis, their generation information, and information on intergenerational road updating; and
the center control unit for computing a guided route based on the departure place and the destination transmitted from the terminal device,
the center control unit for determining whether or not a latest block map not in the terminal device, of block maps containing the guided route, is present in the center storage unit, based on the generation information transmitted from the terminal device and information stored in the center storage unit, wherein
when the latest block map is determined to be present, the center control unit transmits the latest block map and its generation information to the terminal device and further determines whether or not a newly opened road connected to the computed guided route is contained in the latest block map, based on the generation information transmitted from the terminal device, including the information on intergenerational road updating, and information stored in the center storage unit,
when the newly opened road is determined to be present, the center control unit transmits not only the latest block map containing the guided route but also a block map containing the newly opened road to the terminal device,
the information on intergenerational road updating including information on updates of a respective block map from one or more previous generations, the generation information indicating a latest generation numbers of respective block maps.

13. An information system comprising:
a terminal device provided inside a vehicle, including
a terminal storage unit capable of storing block maps together with block map generational information, and
a terminal control unit; and
an information center device provided outside of the vehicle at a location remote from the vehicle, including
a center storage unit capable of storing the block maps, the block map generational information, and intergenerational information, and
a center control unit,
wherein
the block maps are each divided on a block-by-block basis,
the block map generation information indicates a latest generation number for each of the block maps,
The intergenerational information indicates a history of updates for respective block maps across generations,
the terminal control unit is configured to transmit departure place information, destination information, and a set of the generational information associated with a set of the block maps stored in the terminal storage unit to the information center device,
the terminal control unit is configured to store block maps and generational information that are transmitted from the information center device in the terminal storage unit,
the center control unit is configured to compute a guided route based on the departure place and the destination transmitted from the terminal device, and the block maps stored in the center storage unit,
the center control unit is configured to determine whether or not a latest block map containing the guided route is not present in the set of block maps stored in the in the terminal storage unit, but is present in the block maps stored in the center storage unit, based on the generation information transmitted from the terminal device and information stored in the center storage unit,
the center control unit is configured to transmit a latest block map containing the guided route and its associated block map generational information to the terminal device when the latest block map is determined to be not present in the set of block maps stored in the in the terminal storage unit, but is determined to be present in the block maps stored in the center storage unit,
the center control unit is configured to transmit a block map containing a newly opened road connected to the guided route to the terminal device, when the newly opened road connected to the guided route is determined to be present, and
the center control unit is configured to determine whether or not the newly opened road connected to the computed guided route is contained in the latest block map, based on the generational information transmitted from the terminal device, and the block maps, the block map generational information, and the intergenerational information stored in the center storage unit.

14. The information system of claim 13, wherein:
the terminal device further comprises an external communication unit that is connected to a packet communications network;
the information center device further comprises an external communication unit that is connected to the packet communications network; and the information reciprocally transmitted information between the terminal device and the information center device are exchanged by both the external communication unit of the terminal device and the external communication unit of the information center device via the packet communications network.

15. The information system of claim 13, wherein:
the center storage unit stores a whole of map data with respect to a predetermined area; and
the terminal storage unit stores a part of the whole of map data with respect to the predetermined area.

16. The information system of claim 13, wherein:
the intergenerational information includes a latest generation number and information on updates from a multiple previous generations.

17. The information system of claim 13, wherein:
when the newly opened road is determined to be present, the center control unit transmits only the latest block map containing the guided route and the block map containing the newly opened road to the terminal device.

18. A terminal device comprising a terminal storage unit and a terminal control unit comprised by a terminal device included in an information system, comprising:
the terminal device provided inside a vehicle, including
the terminal storage unit capable of storing block maps together with block map generational information, and
the terminal control unit; and
an information center device provided outside of the vehicle at a location remote from the vehicle, including
a center storage unit capable of storing the block maps, the block map generational information, and intergenerational information, and
a center control unit,
wherein
the block maps are each divided on a block-by-block basis,
the block map generation information indicates a latest generation number for each of the block maps,
the intergenerational information indicates a history of updates for respective block maps across generations,
the terminal control unit is configured to transmit departure place information, destination information, and a set of the generational information associated with a set of the block maps stored in the terminal storage unit to the information center device,
the terminal control unit is configured to store block maps and generational information that are transmitted from the information center device in the terminal storage unit,
the center control unit is configured to compute a guided route based on the departure place and the destination transmitted from the terminal device, and the block maps stored in the center storage unit,
the center control unit is configured to determine whether or not a latest block map containing the guided route is not present in the set of block maps stored in the in the terminal storage unit, but is present in the block maps stored in the center storage unit, based on the generation information transmitted from the terminal device and information stored in the center storage unit,
the center control unit is configured to transmit a latest block map containing the guided route and its associated block map generational information to the terminal device when the latest block map is determined to be not present in the set of block maps stored in the in the terminal storage unit, but is determined to be present in the block maps stored in the center storage unit, the center control unit is configured to transmit a block map containing a newly opened road connected to the guided route to the terminal device, when the newly opened road connected to the guided route is determined to be present, and the center control unit is configured to determine whether or not the newly opened road connected to the computed guided route is contained in the latest block map, based on the generational information transmitted from the terminal device, and the block maps, the block map generational information, and the intergenerational information stored in the center storage unit.

19. An information center device comprising a center storage unit and a center control unit comprised by an information center device included in an information system, comprising:

a terminal device provided inside a vehicle, including
a terminal storage unit capable of storing block maps together with block map generational information, and
a terminal control unit; and the information center device provided outside of the vehicle at a location remote from the vehicle, including
the center storage unit capable of storing the block maps, the block map generational information, and intergenerational information, and
the center control unit, wherein the block maps are each divided on a block-by-block basis, the block map generation information indicates a latest generation number for each of the block maps, the intergenerational information indicates a history of updates for respective block maps across generations, the terminal control unit is configured to transmit departure place information, destination information, and a set of the generational information associated with a set of the block maps stored in the terminal storage unit to the information center device, the terminal control unit is configured to store block maps and generational information that are transmitted from the information center device in the terminal storage unit, the center control unit is configured to compute a guided route based on the departure place and the destination transmitted from the terminal device, and the block maps stored in the center storage unit, the center control unit is configured to determine whether or not a latest block map containing the guided route is not present in the set of block maps stored in the in the terminal storage unit, but is present in the block maps stored in the center storage unit, based on the generation information transmitted from the terminal device and information stored in the center storage unit, the center control unit is configured to transmit a latest block map containing the guided route and its associated block map generational information to the terminal device when the latest block map is determined to be not present in the set of block maps stored in the in the terminal storage unit, but is determined to be present in the block maps stored in the center storage unit, the center control unit is configured to transmit a block map containing a newly opened road connected to the guided route to the terminal device, when the newly opened road connected to the guided route is determined to be present, and the center control unit is configured to determine whether or not the newly opened road connected to the computed guided route is contained in the latest block map, based on the generational information transmitted from the terminal device, and the block maps, the block map generational information, and the intergenerational information stored in the center storage unit.

* * * * *